United States Patent
Ishikawa

(10) Patent No.: US 6,666,373 B2
(45) Date of Patent: Dec. 23, 2003

(54) ELECTRONIC CASH REGISTER

(75) Inventor: Kenichi Ishikawa, Yokohama (JP)

(73) Assignee: Matsushita Electric Industrial, Inc., Osaka (JP)

( * ) Notice: Subject to any disclaimer, the term of this patent is extended or adjusted under 35 U.S.C. 154(b) by 116 days.

(21) Appl. No.: 09/932,117

(22) Filed: Aug. 20, 2001

(65) Prior Publication Data

US 2002/0026428 A1 Feb. 28, 2002

(30) Foreign Application Priority Data

Aug. 23, 2000 (JP) .................................... 2000-252847

(51) Int. Cl.$^7$ ................................................. G07G 1/00
(52) U.S. Cl. .......................... 235/7 R; 235/8; 235/12; 705/18; 705/25
(58) Field of Search ........................... 235/7 R, 380, 235/375, 383, 381, 8, 12; 705/18, 25

(56) References Cited

U.S. PATENT DOCUMENTS

| | | | | |
|---|---|---|---|---|
| 4,589,069 A | * | 5/1986 | Endo et al. .................... | 705/17 |
| 4,964,075 A | * | 10/1990 | Shaver et al. ................. | 710/67 |
| 5,355,125 A | | 10/1994 | Fuyama ..................... | 340/5.74 |
| 5,363,296 A | | 11/1994 | Fuyama ....................... | 705/18 |
| 5,450,319 A | * | 9/1995 | Ishikawa et al. ............... | 705/18 |
| 5,615,120 A | * | 3/1997 | Schwartz et al. ........... | 705/407 |
| 5,675,493 A | * | 10/1997 | Schwartz et al. ........... | 705/401 |
| 5,682,481 A | * | 10/1997 | Fuyama ....................... | 705/24 |
| 5,805,831 A | * | 9/1998 | Fuyama ....................... | 705/16 |
| 5,995,944 A | * | 11/1999 | Fuyama ....................... | 705/21 |

FOREIGN PATENT DOCUMENTS

| | | | | |
|---|---|---|---|---|
| JP | 55041580 A | * | 3/1980 | ............ G06F/15/21 |
| JP | 02089199 A | * | 3/1990 | ............ G07G/1/12 |
| JP | 6-259661 | | 9/1994 | |
| JP | 2893989 | | 3/1999 | |

* cited by examiner

Primary Examiner—Karl D. Frech
Assistant Examiner—Kumiko C. Koyama
(74) Attorney, Agent, or Firm—Louis Woo

(57) ABSTRACT

An operator number acquiring code is set in the macro-key data with correspondence to a macro-key. If the macro-key is depressed and there is the operator number acquiring code, the operator (logged on) number is supplied to the following key decode processing. A manager number may be also acquired. If a repetition start and end codes are set, the set data stored between these codes are repeatedly executed the specified number times. If a magnetic card data squiring code is set, data in a magnetic card is read and supplied to the key decode process as input key code.

10 Claims, 15 Drawing Sheets

FIG. 6
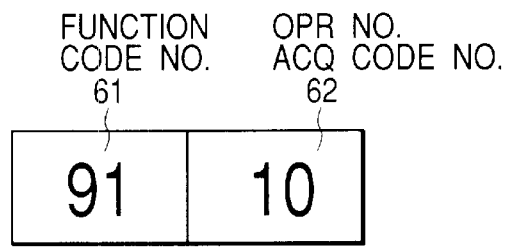
FUNCTION CODE NO. 61 | OPR NO. ACQ CODE NO. 62
--- | ---
91 | 10
FIG. 7
OPERATOR DATA SETTING FILE 32
| | ID CODE 71 | MGR LEVEL 72 | NAME 73 |
| --- | --- | --- | --- |
| OPR NO. 1 | 0123 | 0 | JACK |
| OPR NO. 2 | 0110 | 1 | BOB |
| OPR NO. 3 | 0008 | 1 | JIM |
| | ⋮ | ⋮ | |
| OPR NO. 15 | 1245 | 2 | WILL |
FIG. 8

ELECTRONIC CASH REGISTER

BACKGROUND OF THE INVENTION

1. Field of the Invention

This invention relates to an electronic cash register having a macro-key.

2. Description of the Prior Art

In electronic cash registers used for office work processing or POS systems, key inputting operation was improved with macro-keys. The macro-key generates data which requires a plurality of times of original key operations, at once. Electronic cash registers with a simple macro-key function can perform only the functions defined by existent general function keys. That is, the function to be set to a macro-key was limited to the key codes defined by existent function keys on the keyboard of the electronic cash register. More superficially the function of the macro-key is a batch processing for executing functions assigned to a plurality of keys. Such a prior art simple macro-key function cannot treat complicated processes.

Japanese Patent publication No.289389 discloses an electronic cash register has functions for enabling the macro-key function, executing process assigned to the macro-key, automatically displaying a predetermined message, providing linkage between a plurality of macro-key setting data to assign the linkage to one macro-key, and processing setting key code group, by providing a mode check code, a mode set code, a terminal ID check code, an operator ID check code, a message display code, a macro-key code, and a pause code.

This prior art electronic cash register has a setting means for setting codes to a memory such as a mode check code, a mode set code, a terminal ID check code an operator ID check code, a message display code, a macro-key code, a pause code together with the number of macro-key setting data in addition to the key code data defined for the keyboard with correspondence to macro-key on the keyboard.

Japanese Patent application provisional publication No.6-259661 discloses an electronic cash register macro-key setting codes such as a manager level check code, a time range check code, a date check code, a day of week check code, a printing mode specifying mode, receipt check code, a drawer condition check code. These codes permit these operations only for a manager. The level data in the manger level check code is compared with the manager level of the operator under operating. If the manger level is lower than the check code, the macro-key operation is inhibited.

SUMMARY OF THE INVENTION

The aim of the present invention is to provide a superior electronic cash register.

According to the present invention, a first aspect of the present invention provides an electronic cash register comprising: a keyboard including at least a macro-key; operator registering means for correspondingly registering identification codes and numbers of operators; setting means for storing an operator number acquiring code for said macro-key in a macro-key data storing area in response to a setting operation; logon means for logging on said electronic cash register with said identification code of one of said operators to identify said number of said operator in charge; and operator number acquiring means responsive to said macro-key for judging whether there is said operator number acquiring code in said macro-key data storing area, acquiring and outputting said identified number of said operator as key code data.

According to the present invention, a second aspect of the present invention provides an electronic cash register comprising: a keyboard including at least a macro-key; operator registering means for correspondingly registering identification codes, numbers of operators, and manager rank data, said manager rank data indicating that each of said operator is in either a manager rank or not; setting means for storing a manager number acquiring code for said macro-key in a macro-key data storing area in response to a setting operation; logon means for logging on said electronic cash register with said identification code of one of said operators to identify said number of said operator in charge; and manager number acquiring means responsive to said one of said macro-keys for judging whether there is said manager number acquiring code in said macro-key data storing area, acquiring said identified number of said operator when said manager rank data corresponding to said identified number indicates that said operator is in said manager rank, and outputting said identified number of said operator as said manger number in a key input code format.

According to the present invention, a third aspect of the present invention provides an electronic cash register based on the first or second aspect further comprises repetition code setting means for storing a repetition start code and a repetition end code, and key code data between said repetition start code and said repetition end code in said macro-key data storing area with correspondence to said macro-key in response to anther setting operation, and macro-key code generation means responsive to said macro-key for repeatedly generating and outputting said key code data a specified number of times.

According to the present invention, a fourth aspect of the present invention provides an electronic cash register based on the third aspect, wherein said specified number is also stored in said macro-key data storing area.

According to the present invention, a fifth aspect of the present invention provides an electronic cash register based on the third aspect, wherein said specified number is inputted from said keyboard.

According to the present invention, a sixth aspect of the present invention provides an electronic cash register based on the first or second aspect, further comprises card reading means for reading data in a detachable for card storing data, card reading code setting means for storing a card reading code in said macro-key data storing area with correspondence to said macro-key in response to anther setting operation, and macro-key code generation means for reading said data in said card in response to said macro-key and generating key code data from said data read from said detachable card.

BRIEF DESCRIPTION OF THE DRAWINGS

The object and features of the present invention will become more readily apparent from the following detailed description taken in conjunction with the accompanying drawings in which:

FIG. 6 is an illustration of a data structure of the operator number acquiring code according to the present invention.

FIG. 7 is an illustration showing a data structure of the operator data setting file according to the present invention.

FIG. 8 is an illustration of an operation flow for registering the operator in charge according to the present invention.

The same or corresponding elements or parts are designated with like references throughout the drawings.

DETAILED DESCRIPTION OF THE INVENTION

First Embodiment

In the electronic cash register according to the first embodiment, an operator number acquiring code can be set to a macro-key to process the operator number as key input data in response to depression of the macro-key.

Figure 1:
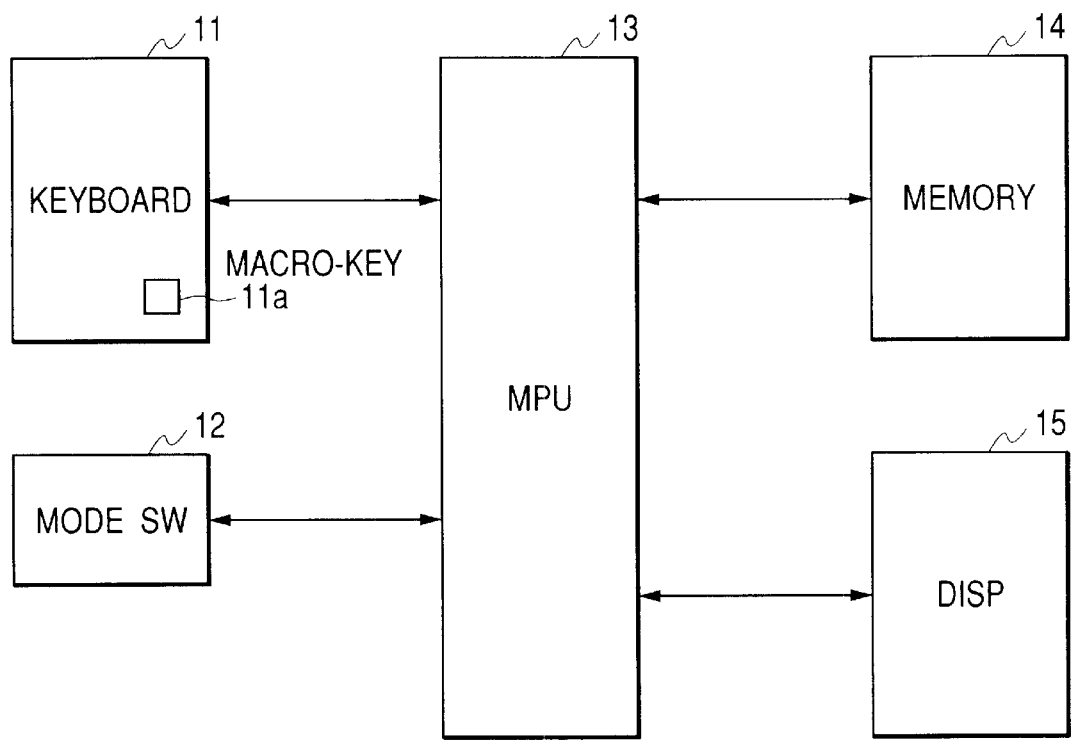
FIG. 1 is a block diagram of the electronic cash register according to the present invention.

FIG. 1 is a block diagram of the electronic cash register according to the present invention. The electronic cash register includes a microprocessor 13, a keyboard 11, a mode switch 12, a memory 14, and a display 15. The keyboard 11 includes numerical keys (not shown), an item registering key, a total key, a subtotal key, and macro-keys 11a, or the like, and in response to the depressed key generates a key code corresponding to the depressed key to supply it to the microprocessor 13. The microprocessor 13 includes a read only memory (ROM) storing processing programs for various operations provided to the electronic cash register. The microprocessor 13 is coupled to the mode switch 12, the memory 14, and the display 15.

Figure 2:
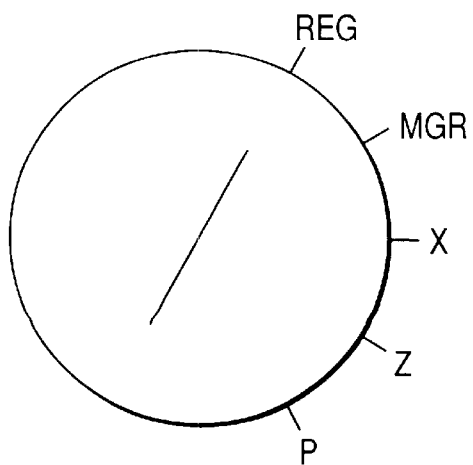
FIG. 2 is a plan view of the mode switch shown in FIG. 1.

FIG. 2 is a plan view of the mode switch 12. The mode switch 12 commands the microprocessor 13 to enter either of an inspection mode (X), an adjustment mode (Z), a programming (setting) mode (P), or the like. The microprocessor 13 reads the data from the mode switch 12 before start of respective process for the electronic cash register.

Figure 3:
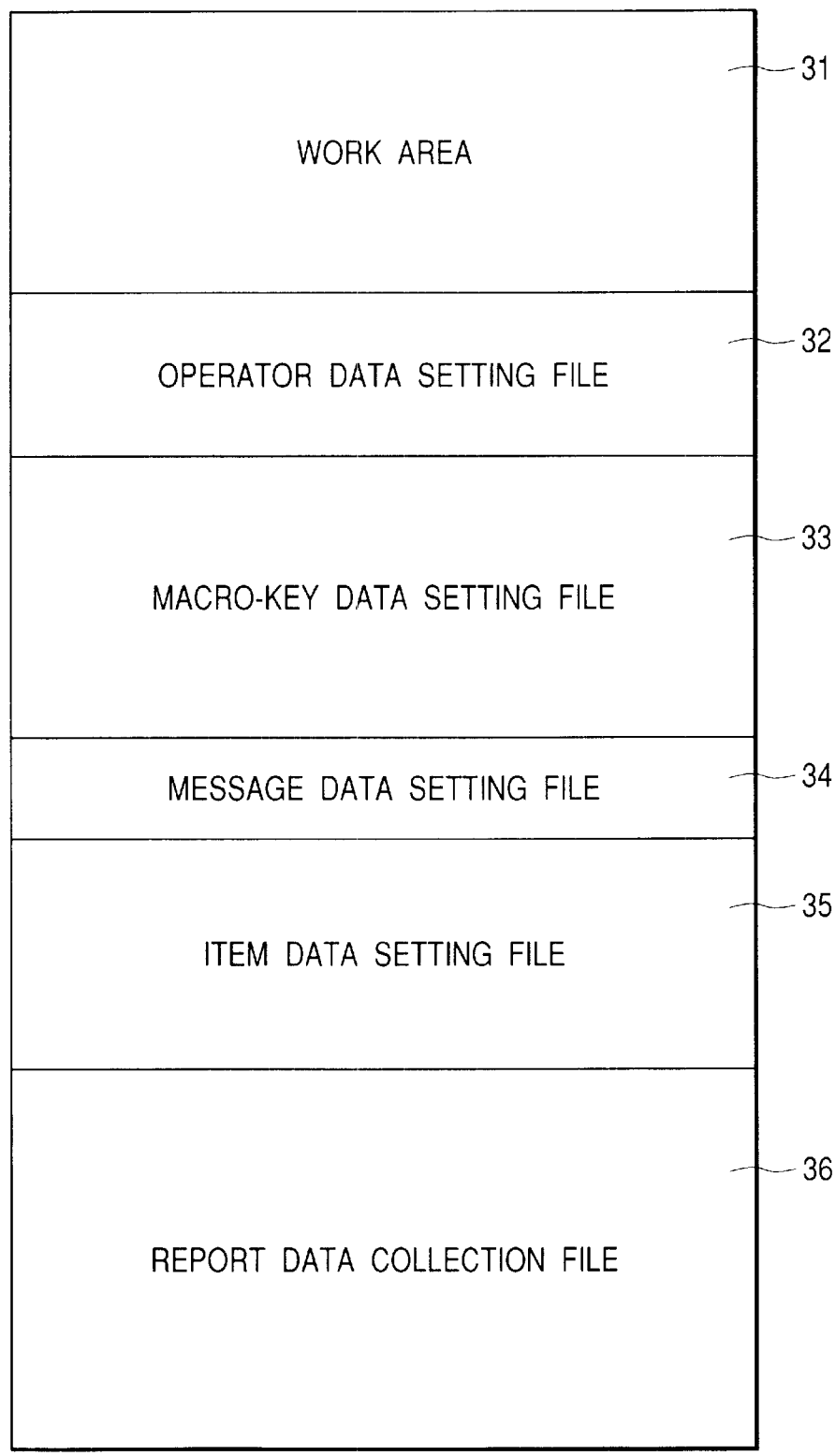
FIG. 3 is an illustration of a data structure in the memory according to the present invention.

FIG. 3 is an illustration of memory data structure of the memory 14 according to the present invention. The memory structure includes a work area 31 used for internal operation of the microprocessor 13, an operator data setting file 32 in which an operator identification code and a manager level, and a name are stored with correspondence with operator numbers, a macro-key data setting file 33 for storing macro-key data with correspondence with the macro-key number, a message data setting file 34 storing display messages in accordance with a message display code, an item setting file 35 for storing article names and unit prices in accordance with the item code, and a report data collection file 36 for storing report data.

Figure 4:
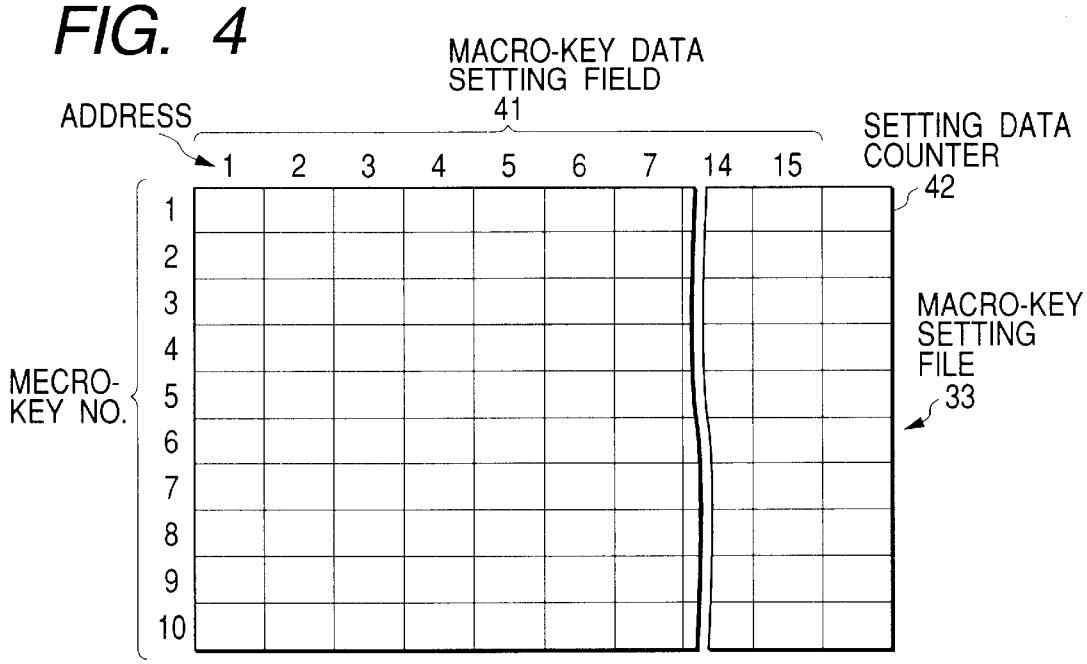
FIG. 4 is an illustration showing a data structure of the macro-key data setting file in the memory according to the present invention.

FIG. 4 is an illustration showing a data structure of the macro-key data setting file 33 in the memory 14. The macro-key data setting file 33 includes a setting field 41 for setting macro-key data with correspondence to respective macro-key number of the macro-keys M1 to M10, and a setting data counter 42 for storing the number of setting data at the macro-key data setting field 33. The whole of fifteen data pieces provided with correspondence to a macro-keys is referred to as macro-key data, and one of fifteen data pieces is refereed to as macro-key setting data, or simply referred to the setting data.

Figure 5:
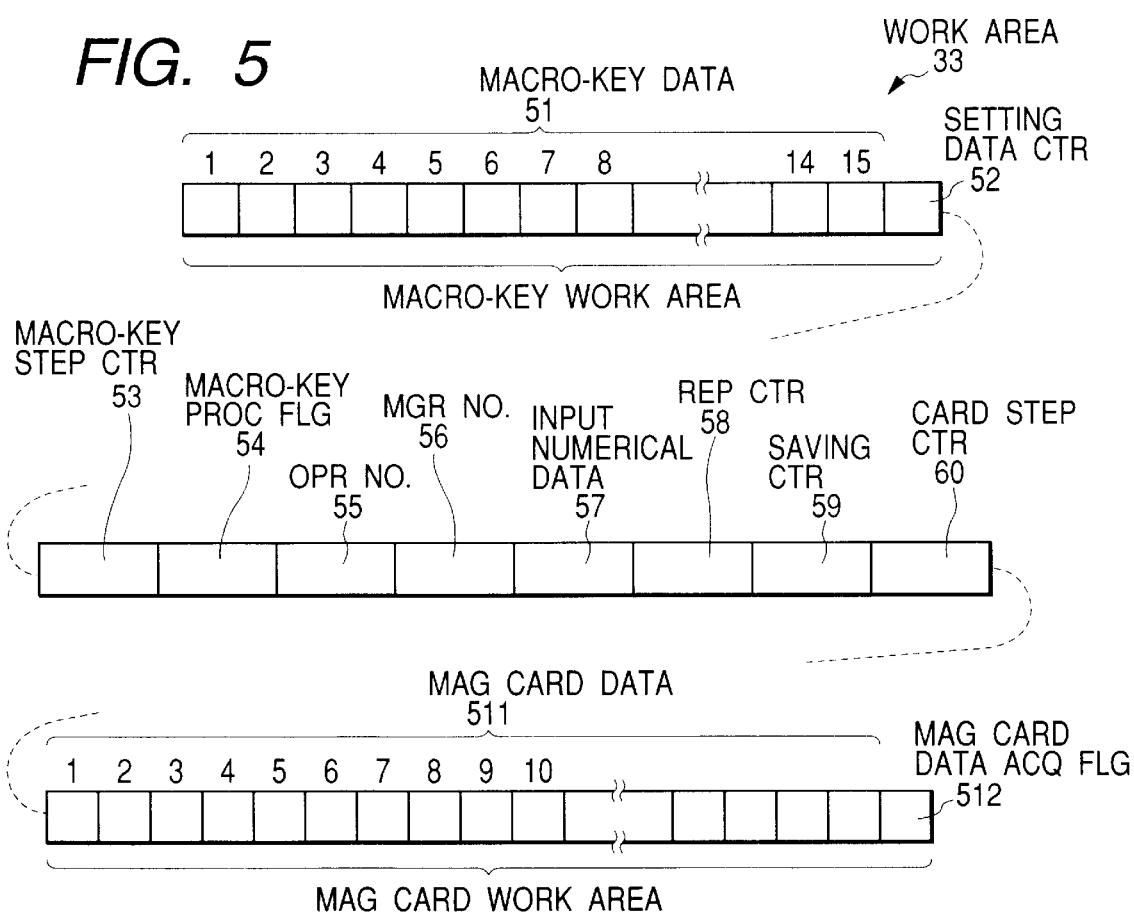
FIG. 5 is an illustration of a data structure of the work area of the memory according to the present invention.

FIG. 5 is an illustration of a data structure of the work area of the memory 14. In FIG. 5, the reference 51 denotes the macro-key data (data area) 51 corresponding to the depressed macro-key. The reference 52 denotes a setting data counter (counter area) 52 indicating the number of data pieces. The reference 53 denotes a macro-key step counter (counter area) 53 indicating address of the macro-key setting data under process. The reference 54 denotes a macro-key processing flag (flag area) 54 indicating the under-process condition of the macro-key data. The reference 55 denotes the operator number indicating the number of the operator (cashier) in charge (operator number storing area). The reference 56 denotes a manager number (manager number area) indicating the operator number of the manager (MGR) in charge. The reference 57 denotes input numerical data 57 (input numerical data area). The reference 58 denotes a micro-key repetition counter for counting the repetition times. The reference 59 denotes a macro-key saving step counter 59 for temporarily stores the value of the macro-key step counter 53. The reference 510 denotes a magnetic care step counter for storing the number of characters in a magnetic card data under processing. The reference 511 denotes magnetic card data area for storing the data read from the magnetic card. The reference 512 denotes a magnetic data acquiring flag for storing a flag indicating an under-reading process of the magnetic card.

FIG. 6 is an illustration of data structure of the operator number acquiring code which is set in the memory 14 as the macro-key setting data. The operator number acquiring code includes a function code number "91" 61 indicating that it is a data acquiring code and an operator number acquiring code number "10" 62.

FIG. 7 is an illustration showing the data structure of the operator data setting file 32 according to the present invention. In the operator data setting file 32, operator identification codes 71 and manager levels (rank) 72, and names 73 are set with correspondence with the operator numbers 1 to 15 were registered in advance.

FIG. 8 is an illustration of an operation flow for registering the operator in charge. A function key indicative of "CSHR", a numerical key of "1", a numerical key of "2", a numerical key of "3", and the function key of "CSHR", are successively depressed to input the operator identification code 71 of "123".

Figure 9:
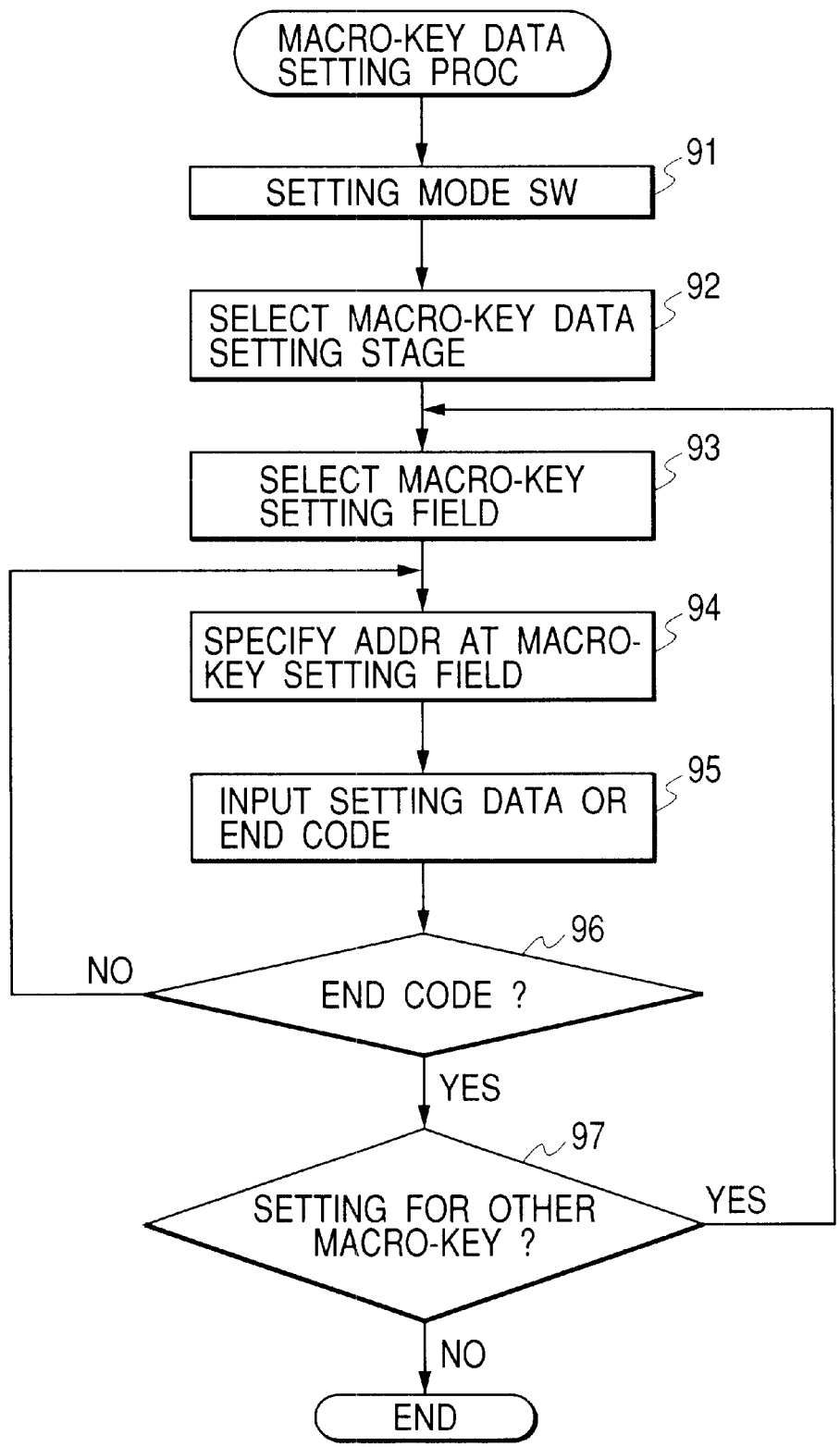
FIG. 9 depicts a flow chart illustrating an operation for setting the macro-key data to the memory according to the present invention.
Figure 10:
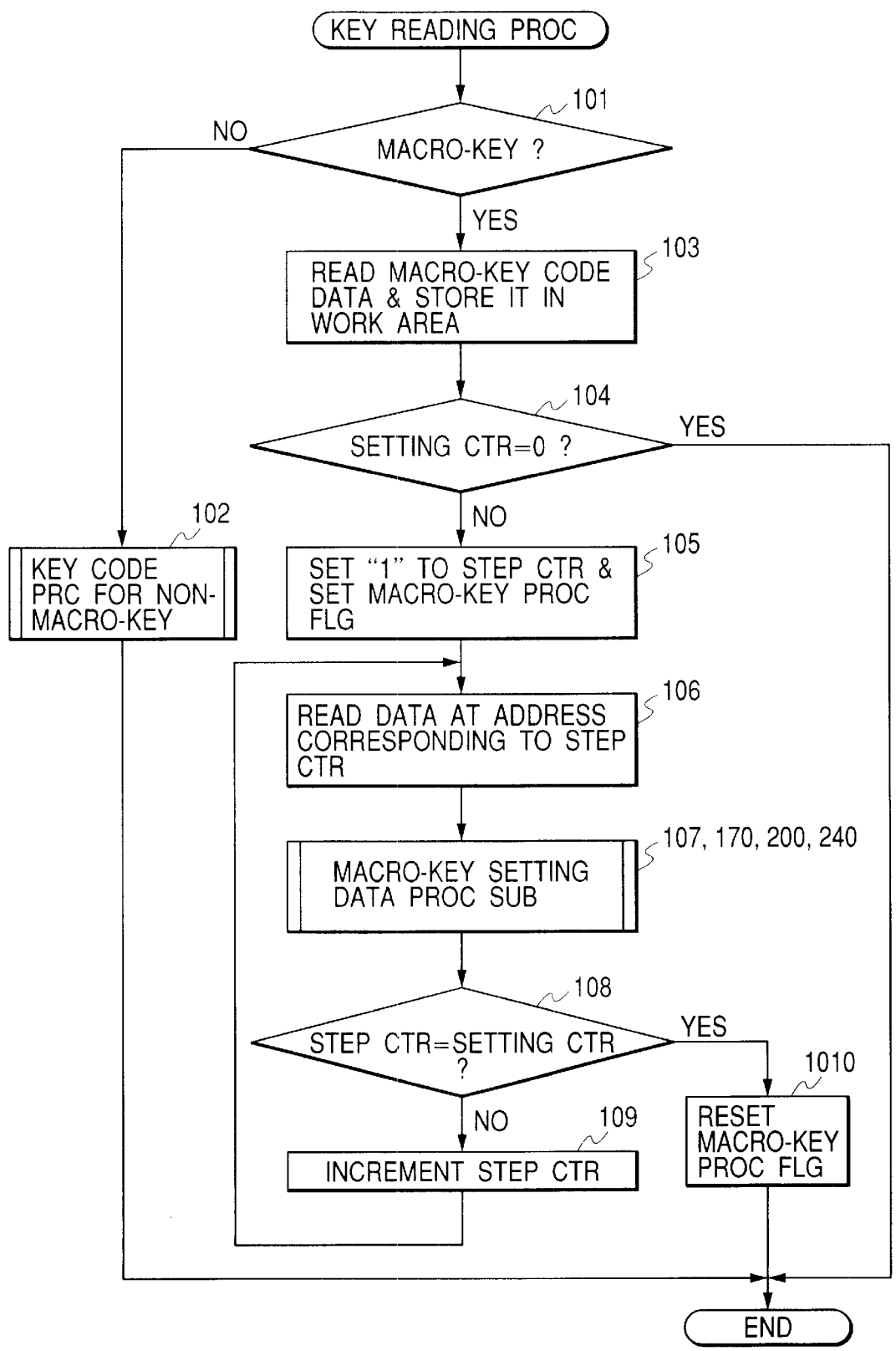
FIG. 10 depicts a flow chart showing a key code reading from the keyboard according to the present invention.
Figure 11:
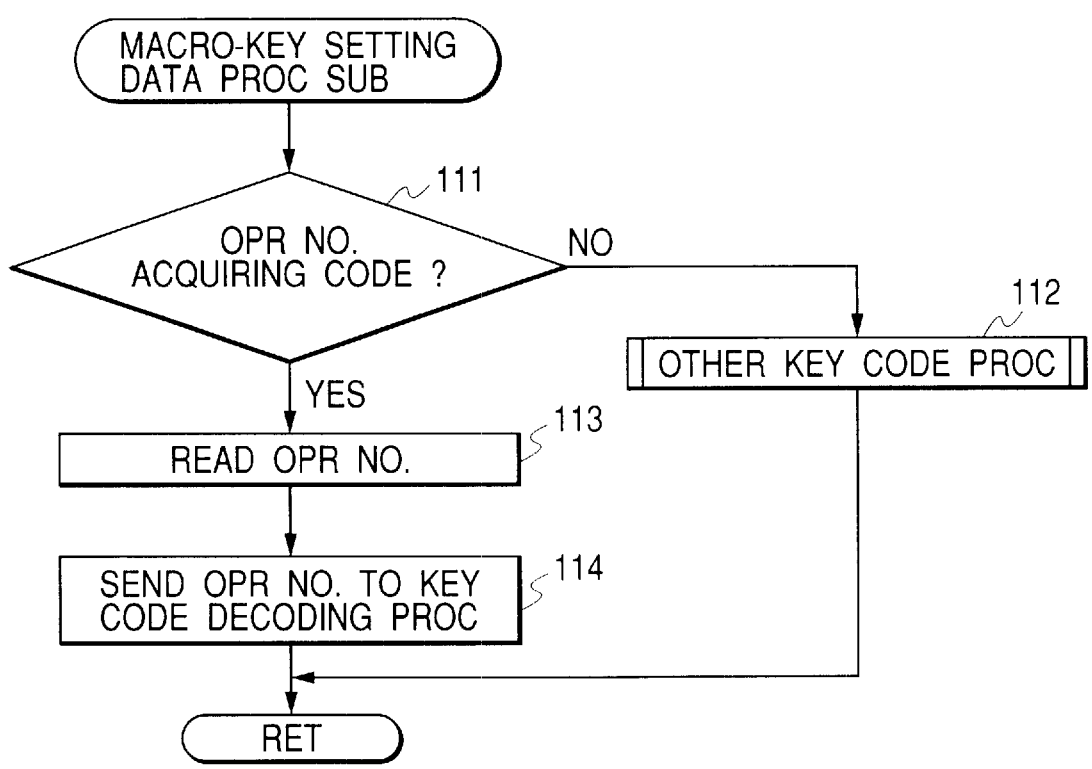
FIG. 11 depicts a flow chart of a subroutine for process for macro-key setting data in FIG. 10.
Figure 12:
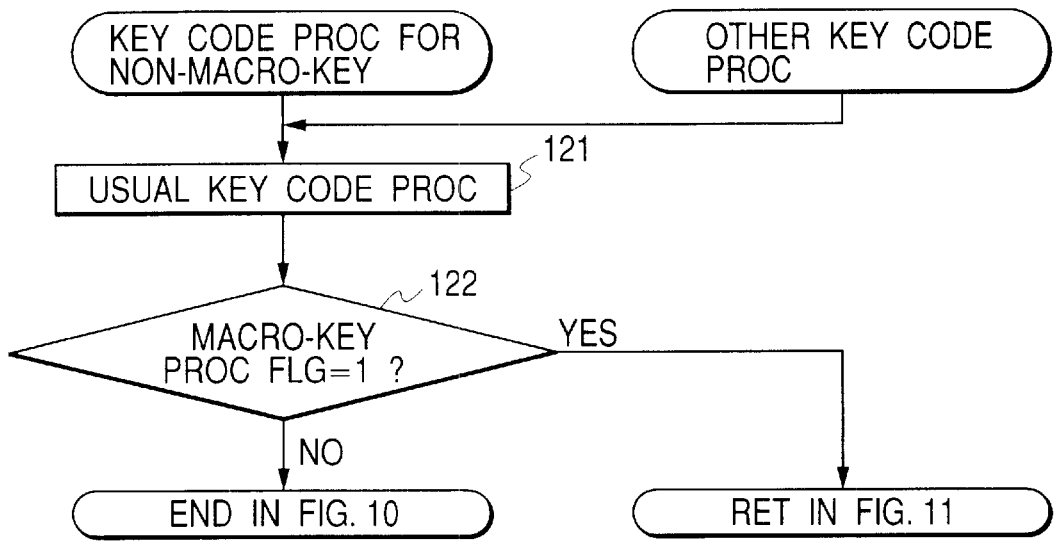
FIG. 12 depicts a flow chart of a subroutine of a key code process for keys other than macro-key in FIG. 10 and a key code process for other key codes.

FIG. 9 depicts a flow chart of a setting operation of the macro-key data to the memory 14. FIG. 10 depicts a flow chart showing a key code reading from the keyboard 11 according to the present invention. FIG. 11 depicts a flow chart of a subroutine for process for macro-key setting data in FIG. 10. FIG. 12 depicts a flow chart of a subroutine of a key code process for non macro-key in FIG. 10 and an other-key-code process.

In this embodiment, it is assumed that the operator number acquiring code "9010" is set to a macro-key M1 as the macro-key data. In response to depression of the macro-key M1, the microprocessor 13 acquires the operator number of the operator in charge and processes this operator number as key input data.

With reference to the flow chart in FIG. 9, the setting operation of the operator number acquiring code will be described. In step 91, an operator turns the mode switch 12 to the position P, that is, the programming mode. In response to this, the microprocessor 13 enters the programming mode (P). In step 92, the operator depresses the numeral key "1" twice and the function key "CASH". In response to this, the microprocessor 13 selects a macro-key data setting stage which is the eleventh processing stage.

In step 93, the operator depresses the numerical key "1" and the function key "subtotal". In response to this, the micro-key data setting filed 41 corresponding to the macro-key No. 1 is specified in the setting file 33. In step 94, the operator depresses the numerical key "1" and the function key "CSHR". In response to this, the address "1" in the macro-key data setting field 4-1 is specified. In step 95, the operator inputs the first setting data for the macro-key M1 with numerical keys and depression of the function key of "CASH". In response to this, the microprocessor 13 stores the first setting data for the macro-key M1 at the address of "1" at the setting field of the macro-key number of "1".

In step 95, if the operator desires to finish inputting the setting data, the operator can input an end code as the setting data of the macro-key M1. This is detected in step 96, the address number of the setting field at this instance is stored in the setting data counter 42 (FIG. 4) as the number of pieces of setting data, and the macro-key data setting process for the macro-key number of "1" (M1) ends. If the input data is not the end code, processing returns to step 94. This key operation is repeated to set given setting data up to fifteen pieces of data in the macro-key data setting file 33 of the macro-key M1.

If the macro-key data is set for any other macro-key, processing returns to step 93, and the processing is repeated from the macro-key number input processing. If there is no other setting data, this processing ends.

As shown in FIG. 6, the operator number acquiring code includes a function code number "91" 61 and the operator number acquiring code number "10" 62. Accordingly, if the operator number acquiring code is set in accordance with the flow of the macro-key data setting process shown in FIG. 9, in step 95, data "9110" is stored in the macro-key data setting field 41. That is, numerical keys "9", "1", "1", "0", and the function key "CASH" are depressed to set the code.

Next, processing of the macro-key data will be described with reference to FIG. 10. The key reading process generates a key code in response to each of keys at the keyboard 11.

The microprocessor 13 judges whether the key code corresponds to the macro-key in step 101. In step 102, if the key code does not correspond to the macro-key, the microprocessor 13 processes the key code in accordance with the key code process for key other than the macro-key in the same way as the conventional key processing operation. That is, a key code decode process is executed by branching off in step 102 to jump to respective key decode processes in accordance with the depressed key. If the key code corresponds to the macro-key, the following process is executed.

The microprocessor 13 reads the macro-key code data corresponding to the depressed micro-key code from the macro-key data setting file 33 and stores the data in the work area 31 used for the internal operation in step 103. The microprocessor 13 checks the setting data counter 52 of which data is transferred from the micro-key data setting file 33. If the value in the setting data counter 52 is zero, which means that no macro-key data has been set, the microprocessor 13 finishes the macro-key reading process.

If the value in the setting data counter 52 is not zero, the microprocessor 13 sets "1" in the macro-key step counter 53 and sets a macro-key processing flag 54 indicating "under processing of a macro-key" in step 105. Next, the microprocessor 13 reads the data at the area corresponding to the data in the macro-key step counter 53 in step 106. The microprocessor 13 executes process in accordance with the read data in step 107 which is shown in the flow chart shown in FIG. 11. After this process, the microprocessor 13 compares the value in the macro-key step counter 53 with that in the setting data counter 52. If there is agreement in step 108, which means end of the process of the last setting data, processing proceeds to step 1010 to finish the reading process for the macro-key. If there is no agreement in step 108, the microprocessor 13 adds one to the value of the macro-key step counter 53 in step 109, and processing returns to step 106. In step 1010, the microprocessor 13 resets the macro-key processing flag 54 indicating "under process of the macro-key data", and finishes the reading process of the macro-key data.

Referring now to FIG. 11, there is shown a flow diagram of an operator number acquiring process. The microprocessor 13 acquires the operator number as follows:

In step 111, the microprocessor 13 reads the setting data from the macro-key data 51 at the address corresponding to the value in the macro-key step counter 53 and judges whether the read macrokey setting data corresponds to the operator number acquiring code. If the macro-key setting data does not correspond to the operator number acquiring code, the microprocessor 13 executes other key code processes in step 112. If the macro-key setting data corresponds to the operator number acquiring code, the microprocessor 13 reads the operator number in charge (logged on) from the operator number 55 in the work area 31 in step 113. The operator number 55 is supplied to a key code decoder (key code decoding process). That is, the logged on operator number is supplied to the key code decoding process in a key input data format such that the logged on operator number is inputted with a numeral key and supplied to the key code decoding process. Referring now to FIG. 8, there is shown an operation flow for logging on (registration) procedure. An operator logging on this electronic cash register operates the keyboard 11 before the usual electronic cash register operation (at start of work). As shown in FIG. 8, the operator in charge successively depresses the function key "CSHR" and the numeral key "1", the numeral key "2", the numeral key "3", and the function key "CSHR" to input operator identification code of "123". The operator identification code "123" is searched from the operator data setting file 32 (FIG. 7) to obtain the operator number "1" corresponding to the operator identification code "123", and the microprocessor 13 registers the number as the logged on operator's number (in-charge-operator's number) at the operator number 55 at the work area 31.

As mentioned above, when the macro-key M1 is depressed, the microprocessor 13 supplies the operator number "1" to the key code decoder such that the microprocessor 13 supplies the key code assigned to the numeral key "1" to the key code decoder. If the macro-key setting data is not the operator number acquiring code, the microprocessor 13 executes one of key code process programs corresponding to the key code in accordance with the key code process for non-macro-key process in step 102.

Referring now to FIG. 12, there is shown an operation of the key code process for non-macro-keys and the other key code process. The macro-key processing flag 54 indicating "under macro-key processing" provides distinction between the key code process for keys other than the macro-key (non-macro-key) shown in FIG. 10 and the other key code process shown FIG. 11. The key code process is common to those processes. However, the return addresses are different. The other key code process shown in FIG. 11 is a partial process of the macro-key setting data process, so that, after processing, processing should return to the macro-key setting data process to execute the process of the macro-key setting data for the macro-key at the next address. For this, processing branches off to the return of the flow chart shown in FIG. 11. On the other hand, the key code process for non-macro-key is outside the macro-key process, so that after this process, the microprocessor 13 enters the standby mode for receiving a key input. Thus, the processing returns to the end in FIG. 10. That is, the macro-key processing flag 54 is used for this judgment in step 122.

In the first embodiment, the keyboard 11 originally provided to the electronic cash register is used. However, other special keyboard can be used, and other electronic cash register or a computer supplies the key codes including key code for the macro-keys. In the first embodiment, the number of pieces of setting data is set to detect the last setting data. However, it is also possible to detect the last setting data with an end code or invalid codes may be written in the remaining area of the setting area.

As mentioned above, according to the first embodiment, the operator number acquiring code is set to a macro-key. In response to depression of the macro-key, the logged on operator's number is processed as key input data, so that the operator number can be automatically supplied to the key code decoding process in response to depression of the macro-key.

Second Embodiment

The electronic cash register according to the second embodiment is substantially the same as that of the first embodiment. The difference is that in response to a macro-key, a manager number is outputted as key input data.

Figure 13:
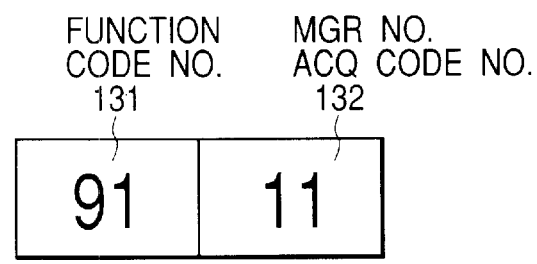
FIG. 13 illustrates a data structure of a manager number acquiring code set in the memory according to a second embodiment.
Figure 14:
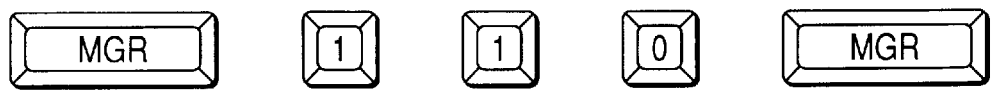
FIG. 14 illustrates a key input operation of specifying the manager in charge according to the second embodiment.
Figure 15:
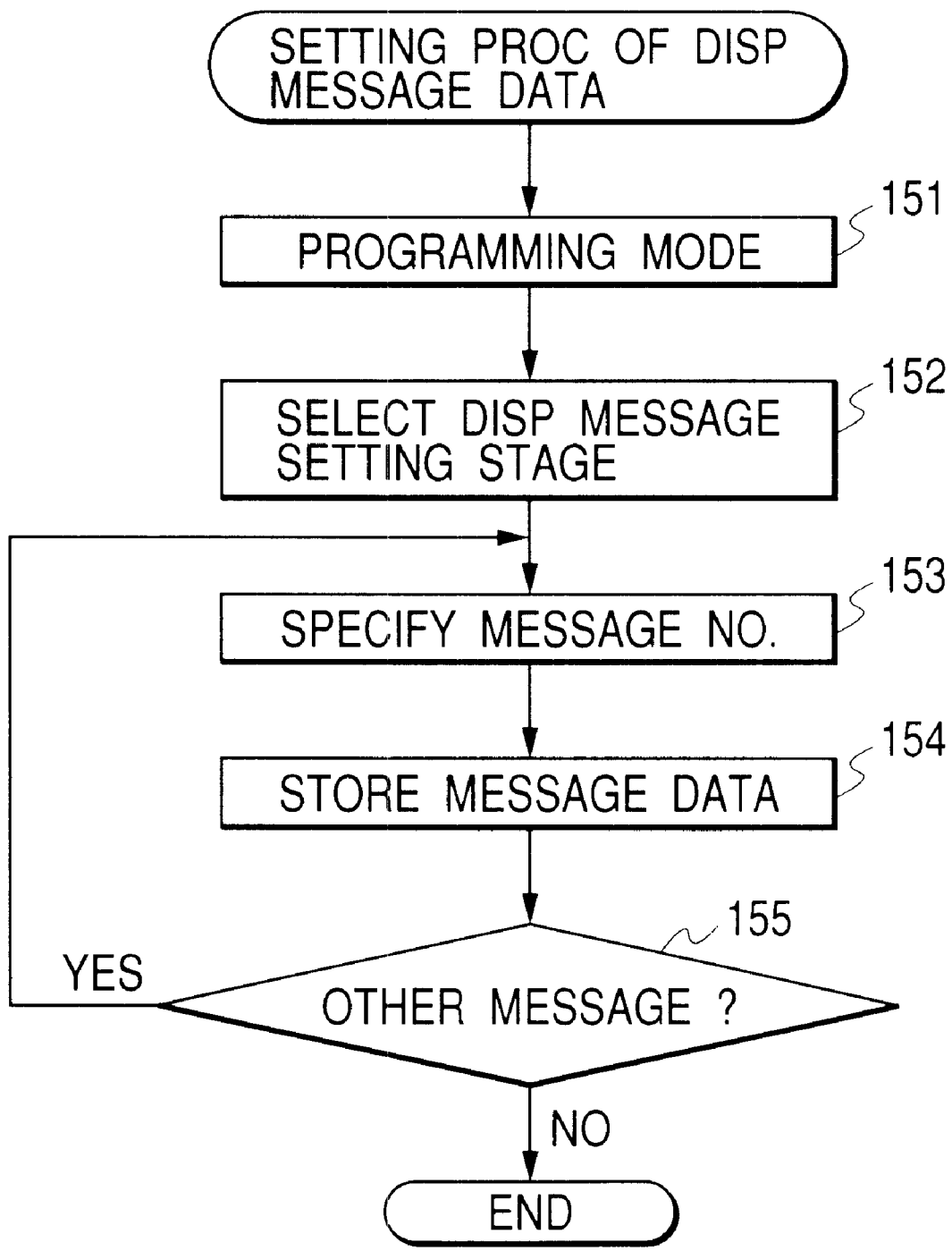
FIG. 15 depicts a flow chart of a setting operation of a display message in the message setting file.
Figure 16:
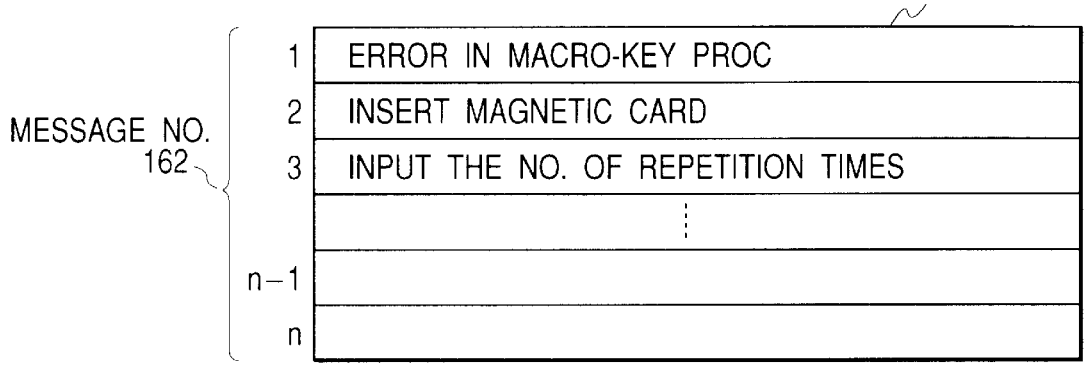
FIG. 16 is an illustration of a structure of the display message setting file according to the present invention.
Figure 17:
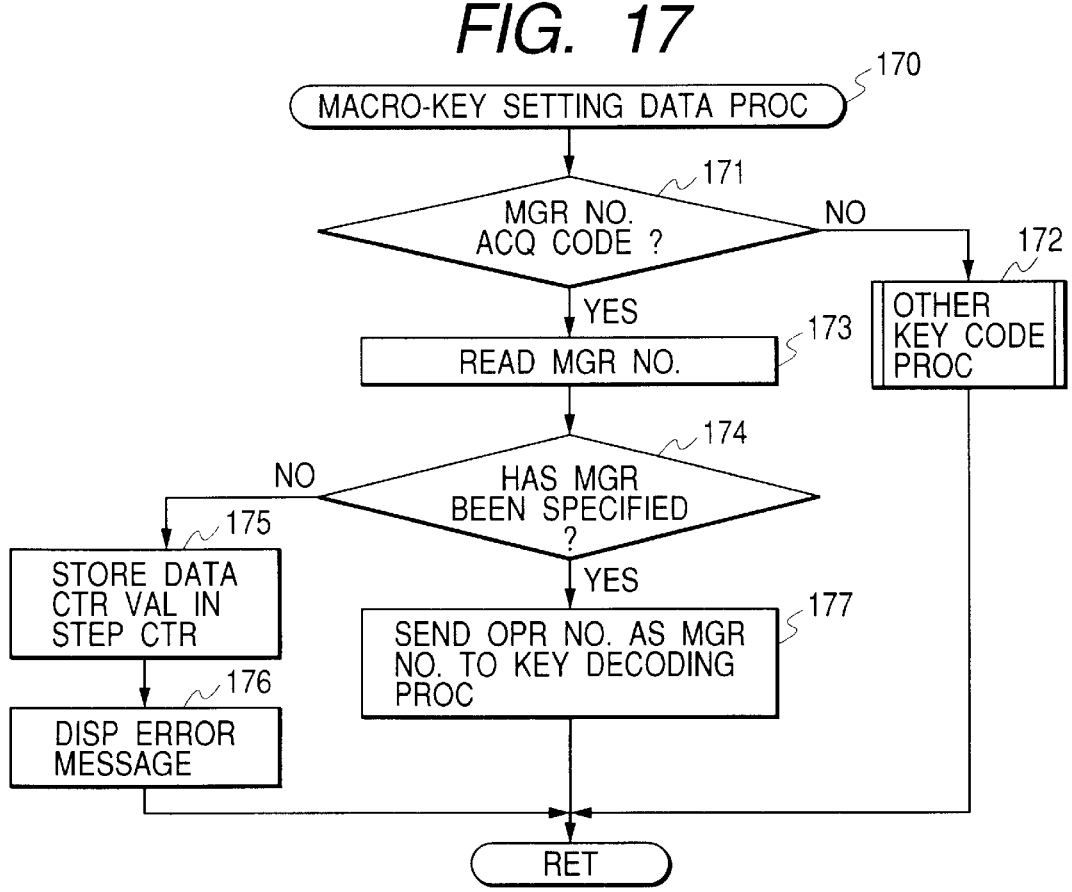
FIG. 17 depicts a flow chart of macro-key setting data processing operation according to the second embodiment.

FIG. 13 illustrates a data structure of a manager's number acquiring code to be set in the memory 14 according to the second embodiment. FIG. 14 illustrates a key input operation of specifying the manager in charge according to the second embodiment. FIG. 15 depicts a flow chart of a setting operation of a display message in the message setting file 34. FIG. 16 is an illustration of structure of the display message setting file. FIG. 17 depicts a flow chart of macro-key setting data processing operation.

In this embodiment, the manager number acquiring code is set as setting data for the macro-key M2. In response to depression of the macro-key, the microprocessor 13 acquires the specified manager member, and the manager number is processed as the key input data.

Referring now to FIG. 14, the manager specifying operation will be described. The operator (cashier) in charge who has been registered in this electronic cash register as a manager as shown in FIG. 7, can operate this electronic cash register as a manager by successively depressing a function key "manager" (MGR), the numeral key "1", the numeral key "1", the numeral key "0", and the function key "manager" to input operator identification code of "110" for the manager rank operation. The microprocessor 13 searches the manager identification code "110" from the data setting file 32 shown in FIG. 7 to obtain the operator number "2" corresponding to the operator identification code "110". Next, the microprocessor 13 registers the logged-on operator number as the manager number at the manager number area 56 at the work area 31.

This manager specifying operation can be made at any time as required. This manager specifying operation allows the operator to do operations only allowed for the manager. This operation is not always necessary for the usual operation of the electronic cash register, which is different from the specifying operation of the operator described in the first embodiment.

Referring now to FIG. 13, setting of the manager number acquiring code will be described. As shown in FIG. 13, the manager number acquiring code includes a function code number "91" 131 and the operator number acquiring code number "11" 132. This manager number acquiring code is set in accordance with the flow of the macro-key data setting process shown in FIG. 9. In step 95, data "9111" is stored in the macro-key data setting field 41 as the manager number acquiring code.

Here, setting processing of a display message will be described, which is used in the manager number acquiring process. FIG. 15 is a flow diagram illustrating the display message processing operation and FIG. 16 is an illustration of data structure of display message data setting area 161.

This operation does not directly relate to the manager number acquiring process but used for error processing in the manager number acquiring process.

Messages for displaying are set in the message setting file 34 in accordance with the process shown in FIG. 15. The message setting file 34 includes a plurality of display message setting areas 161 as shown in FIG. 16.

In step 151, an operator turns the mode switch 12 to the position P, i.e., the programming (setting) mode. In response to this, the microprocessor 13 enters the programming (setting) mode in step 151. In the following step 152 the operator depresses the numeral key "1", the numeral key "2", and the function key "CASH" on the keyboard 11. In response to this, the microprocessor 13 selects a display message setting stage 12. In step 153, the operator depresses the numeral key "1" and the function key "subtotal". In response to this, the microprocessor 13 selects a display message setting area 161 of which to a message number "1" in the message setting file 34. In step 154, the operator inputs message data and depresses the function key "CASH". In response to this, the microprocessor 13 stores the message data in the setting area 161 at the address "1". In step 155, this key operation is repeated to set a plurality of desired display messages in the message setting file 34.

Referring now to FIG. 17, the manager's number acquiring process will be described. The key reading process in the second embodiment is executed in the same manner as that of the first embodiment, shown in FIG. 10. That is, after step 106 the processing jumps to step 171 in the macro -key setting data processing subroutine 170 shown in FIG. 17.

In step 171, the microprocessor 13 reads the macro-key setting data at the address corresponding to the macro-key step counter 53, and judges whether the read data is the manager number acquiring code. If the read data is not the manager number acquiring code, the microprocessor 13 executes the other key code process in step 172. This process is the same as that of the first embodiment shown in FIG. 12.

If the read data is the manager number acquiring code, the microprocessor 13 reads the manager number from the manger number area 56 in step 173. In step 174, the microprocessor 13 judges whether the operator is registered as a manager by checking the read data. In step 175, if the data does not specify the operator as a manager, the microprocessor 13 stores the value of the setting data counter 52 in the macro-key step counter 53. In the following step 176, the microprocessor 13 sends an error message of which message number is "1" to the display 15 and ends the macro-key setting data process.

If in step 174, the operator has been registered as a manager, i.e., the logged-on operator is registered as a manager, the microprocessor 13 transfers the acquired manager number to the key code decoding process such that a key code indicative of the manager number is inputted from the keyboard.

If it is assumed that an operator has an operator number "2" and the operator has been registered as a manager, the operator is logged on with the operator identification code "110". When the operator depresses the macro-key, the operator number "2" is sent as the manager number "2". For example, if the macro-key M2 is depressed, the microprocessor 13 transfers the operator number "2" to the key code decoding process such that the microprocessor 13 transfers the key code for the numeral key "2" in response to the key operation by the operator.

As mentioned above, in the electronic cash register according to the second embodiment, the manager number acquiring code is set to a macro-key, and in response to depression of the macro-key, the manager number is processed as the key input data, so that the manager number can be automatically inputted (generated) by depression of the macro-key.

Third Embodiment

The electronic cash register according to the third embodiment repeatedly processes the macro-key setting data stored between a repetition start code and a repetition end code a specified number of times in response to a macro-key.

Figure 18:
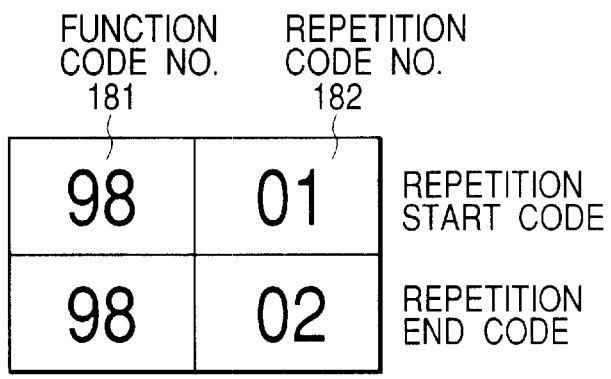
FIG. 18 is an illustration of a data structure of code data according to a third embodiment.
Figure 19:
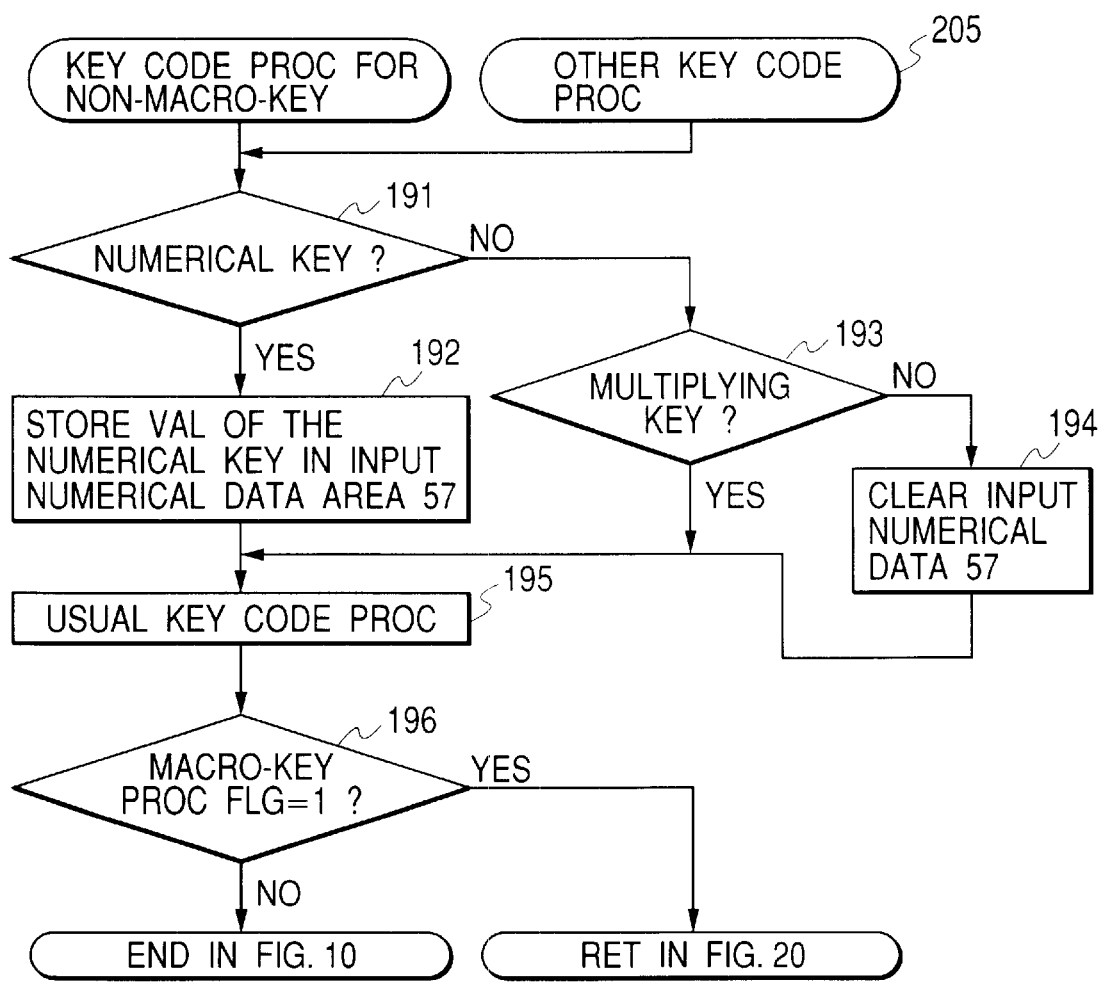
FIG. 19 depicts a flow chart of a key code process for non-macro-keys shown in FIG. 10 and a key code process for other key code process according to the third embodiment.
Figure 20:
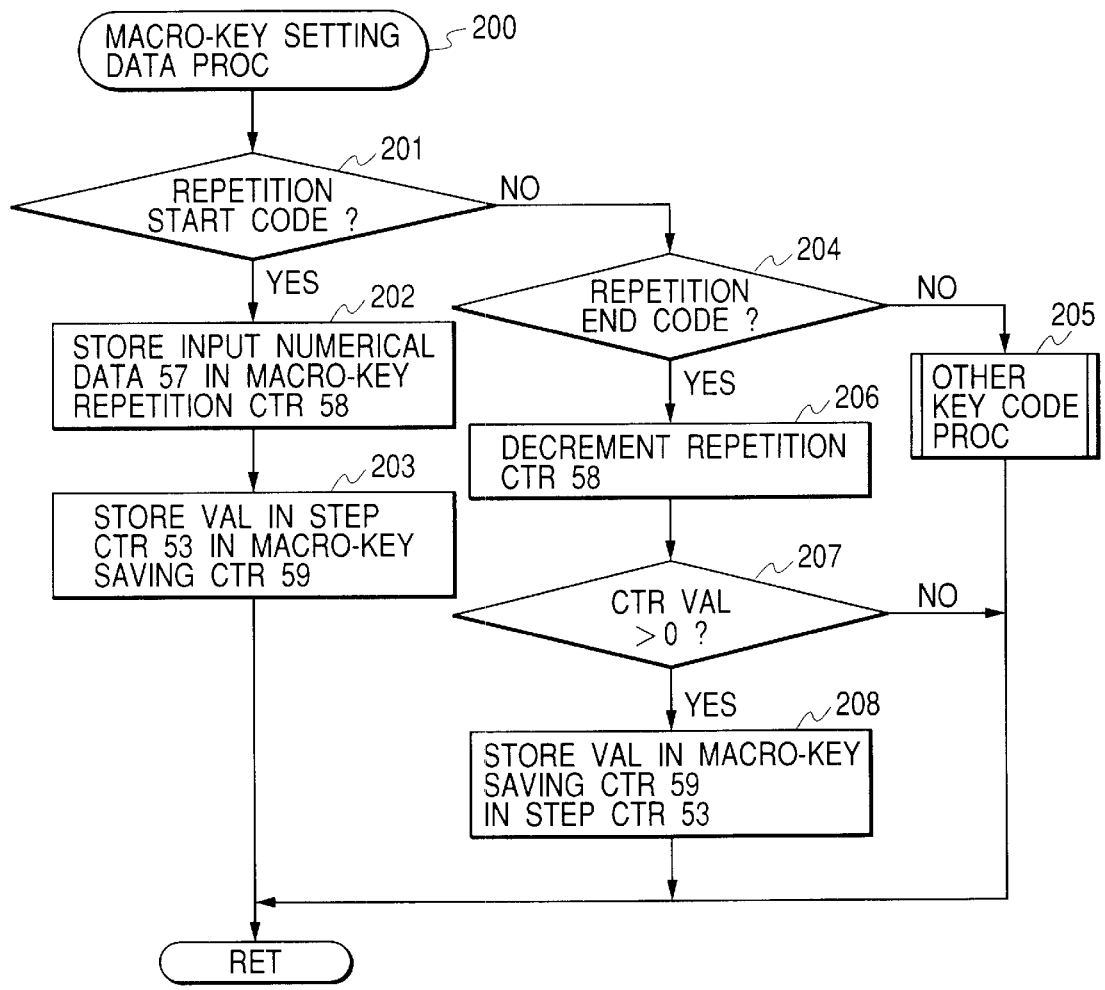
FIG. 20 depicts a flow chart showing a macro-key setting data process subroutine 200 shown in FIG. 10 according to the third embodiment.

The electronic cash register according to the third embodiment has substantially the same structure as that of the first and second embodiments. The difference is that a function for repeatedly processing macro-key setting data is further provided. FIG. 18 is an illustration of data structure of code data according to the third embodiment. FIG. 19 depicts a flow chart of a key code process for non-macro-keys shown in FIG. 10 and a key code process for other key code process. FIG. 20 depicts a flow chart showing macro-key setting data process subroutine 200 shown in FIG. 10 according to the third embodiment.

In this example, the repetition start code and the repetition end code are set as the macro-key data. When the macro-key registered to have the repetition start and end codes is depressed, the microprocessor 13 repeatedly processes the macro-key data stored between the repetition start code and the repetition end code a specified times.

As shown in FIG. 18, the repetition start code includes the function code "98" 181 and a repetition start code number "01" 182. The repetition end code includes the function code "98" and the repetition end code number "02". The repetition start code and the repetition end code are stored in the memory 14 as macro-key setting data in accordance with the flow chart shown in FIG. 9. In step 95, the microprocessor 13 stores data "9801" as the repetition start code and data "9802" as repetition end code at the macro-key data setting field 41. The key codes to be repeatedly executed are stored between the repetition start code and the repetition end code.

With reference to FIG. 19, inputting the repetition times data will be described. The key reading process in the third embodiment is executed in accordance with the key reading process shown in FIG. 10. The macro-key setting data processing subroutine 200 in FIG. 10 is executed in accordance with the flow chart shown in FIG. 20. The key code process for non-macro-keys in FIG. 10 and the other key code process in FIG. 20 in the third embodiment are executed in accordance with the flow chart shown in FIG. 19.

The key reading process is executed as shown in FIG. 10 and in step of the macro-key setting data process subroutine 200, processing jumps to step 201 in FIG. 20 and jumps to step 191 (FIG. 19) from the other key code process 205 in FIG. 20 to input numerical data specifying the number of repetition times.

Before this process, for example, in step 103 in FIG. 10, the microprocessor 13 displays a prompt message for requesting depression of a numerical key using the message data at an address "3". In response to this, that is, after depression of the macro-key, the operator inputs the number of repetition times with numerical key.

In step 191, the microprocessor 13 judges whether the key code is a numerical value. If the key code is a numerical value, the microprocessor 13 stores the numerical value in the input numerical data area 57 in step 192. If the key code is not a numerical key value, the microprocessor 13 judges whether the key code is a multiplying key (such as @ and x) in step 193. If the key code is not a multiplying key, the microprocessor 13 clears the value in the input numerical data area 57 in step 194. After steps 192 and 194, in step 195, the microprocessor 13 executes key code processing in accordance with the key code.

The repetition process will be described with reference to FIG. 20. In the macro-key data setting data process 200 in FIG. 10 is executed as shown in FIG. 20. In step 201, the microprocessor 13 reads the micro-key data at the address indicated by the macro-key step counter 53 and judges whether the red data is the repetition start code. If it is the repetition start code, the microprocessor 13 stores the value in the input numerical data area 57 in the repetition counter 58 in step 202. The microprocessor 13 stores the value in the macro-key step counter 53 in the macro-key saving counter 59 in step 203, and processing returns.

In step 201, if the data is not the repetition start code, the microprocessor judges whether the data is repetition end code in step 204. If the data is not the repetition end code, the microprocessor executes processing for other keys in step 205. If the data is repetition end code, the microprocessor 13 decreases the value in the repetition counter 58 by one in step 206. In the following step 207, the microprocessor 13 judges whether the value in the repetition counter 58 is greater than zero.

If the value is equal to or lower than zero, processing directly returns. If the value is greater than zero, the microprocessor 13 stores the value in the macro-key saving step counter 59 in the macro-key step counter 53. This provides repetition processing key codes stored between the repetition start code and repetition end code the specified times.

The macro-key processing flag 54 indicating "under processing of the macro-key data" is used for provide distinction between the key code process for non macro-keys shown in FIG. 10 and the key code process for other key process in FIG. 20. These processes are the same but the branch addresses after the process are different. That is, the key code process for other keys from the flow chart shown in FIG. 20 returns to the end of the flow chart shown in FIG. 10 after process in step 195 though process in step 196.

The key code process for keys other than macro-keys from the flow chart shown in FIG. 10 returns to the end of the flow chart shown in FIG. 10. That is, the microprocessor 13 judges whether the macro-key processing flag has been set in step 196. If the macro-key processing flag has been set, processing returns to a return point of the flow chart shown in FIG. 20. If NO, processing returns to the end of the flow chart shown in FIG. 10.

Figure 21:
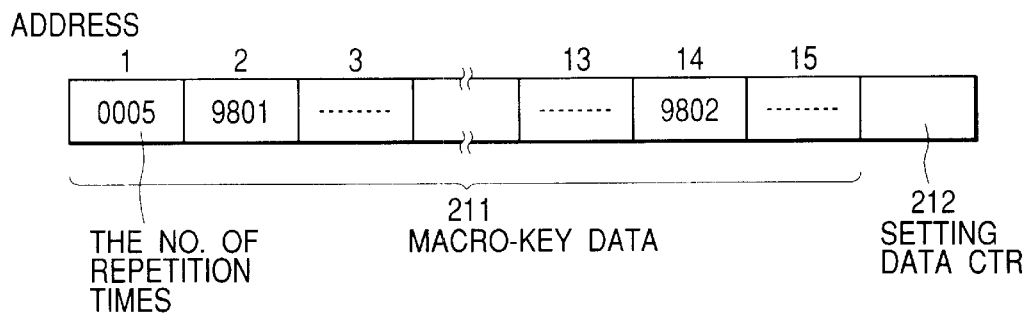
FIG. 21 is an illustration of an example of setting data of macro-key data according to the third embodiment.

FIG. 21 is an illustration of an example of setting data of macro-key data according to the third embodiment.

In the above-mentioned example, the number of repetition times is inputted with a numerical key after depression of the macro-key. On the other hand, with reference to FIG. 21, an example that the number of repetition times is previously set will be described.

As shown in FIG. 21, at address "1" of the macro-key data, value of five is stored as the repetition times, and at address "2", the repetition start code "9801" is stored, and at address "14", the repetition end code 9802" is stored. If the corresponding macro-key is depressed, the value "5" is supplied to the key code process where the value "5" is stored in the input numerical data area 57. Next, the data between the addresses "3" to "13" is repeatedly transmitted to the key decode process as key input data five times.

As mentioned above, according to the third embodiment, the repetition start code and the repetition end code can be set in the electronic cash register. In response to depression of the macro-key, the data between the repetition start code and the repetition end code is successively processed the specified times.

Fourth Embodiment

Figure 22:
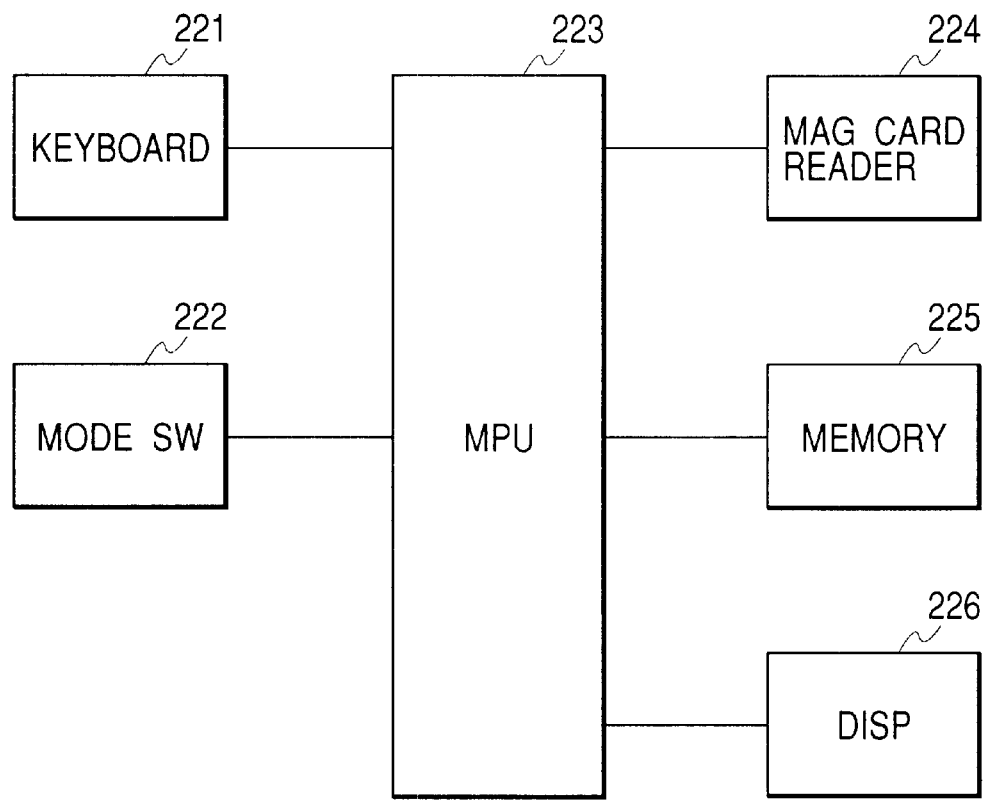
FIG. 22 is a block diagram of the electronic cash register according to a fourth embodiment.

FIG. 22 is a block diagram of the electronic cash register according to the fourth embodiment. The electronic cash register according to the fourth embodiment includes a magnetic card reader 224 in addition of the structure of the first embodiment or the second embodiment.

Figure 23:
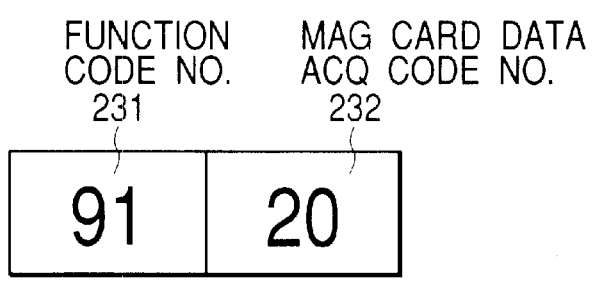
FIG. 23 is an illustration of a data structure of the magnetic card data acquiring code according to the fourth embodiment.
Figure 24:
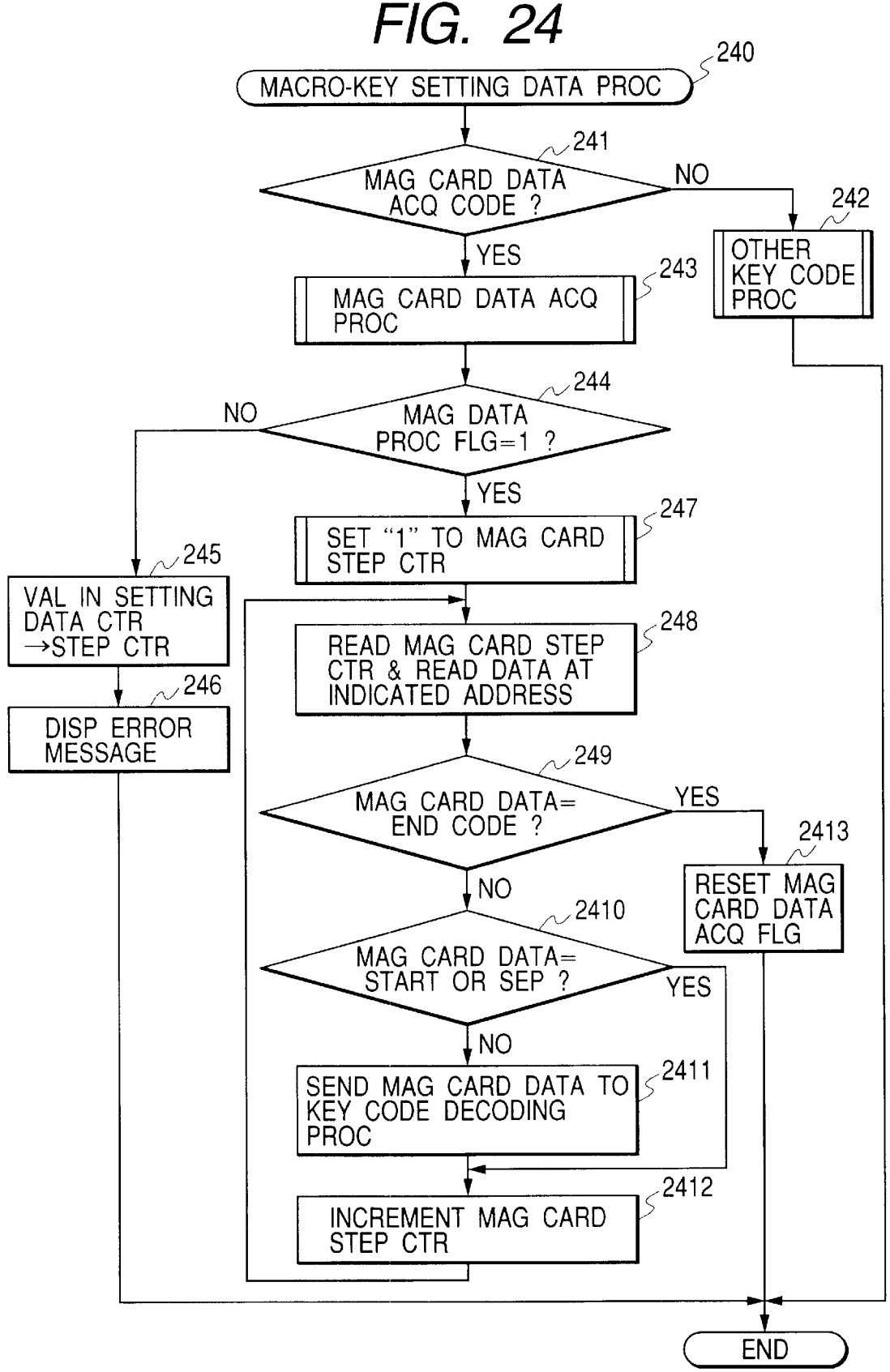
FIG. 24 depicts a macro-key setting data processing according to the fourth embodiment.
Figure 25:
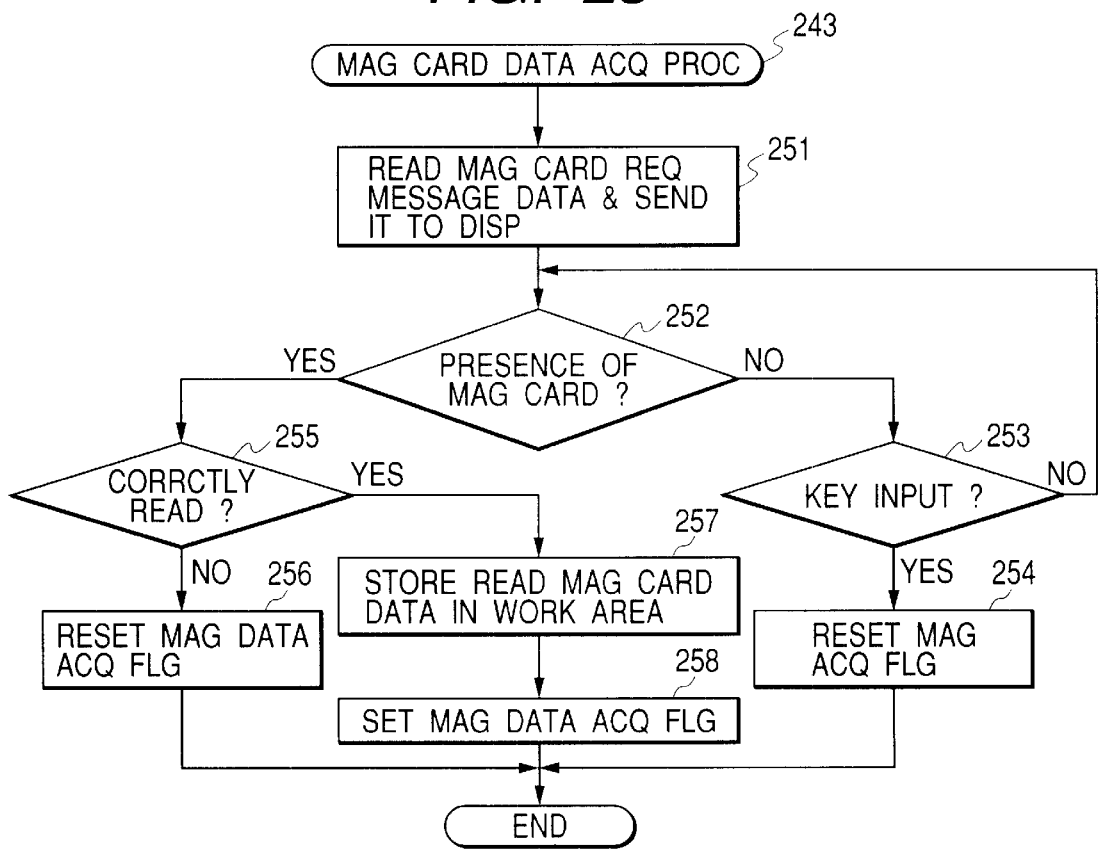
FIG. 25 depicts a flow chart showing the magnetic card data acquiring process according to the fourth embodiment.
Figure 26:
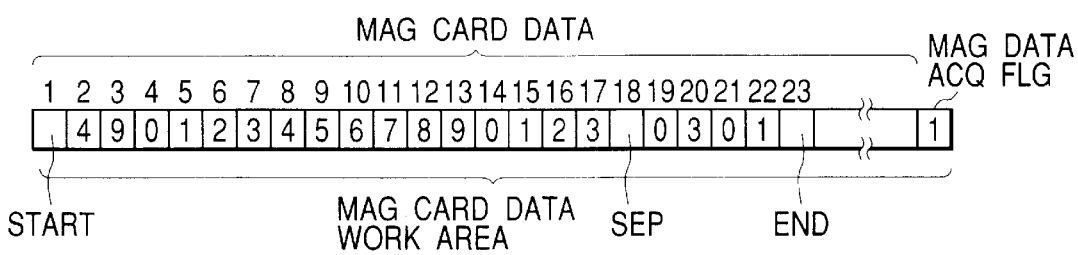
FIG. 26 is an illustration of a data format of the magnetic card according to the fourth embodiment.

FIG. 23 is an illustration of data structure of the magnetic card data acquiring code. FIG. 24 depicts a macro-key setting data processing according to the fourth embodiment. FIG. 25 depicts a flow chart showing the magnetic card data acquiring process according to the fourth embodiment. FIG. 26 is an illustration of data format of the magnetic card.

In this embodiment, as the macro-key setting data, a magnetic card data acquiring code is set in the macro-key data setting field 41. Then, if the magnetic card data acquiring code has been set, the card data is read from a magnetic card from the magnetic card reader 224, and the microprocessor 13 processes the read data such that the key input data is inputted.

As shown in FIG. 23, the magnetic card data acquiring code includes a function code "91" 231 indicating one of data acquiring codes and a magnetic card data acquiring code number "20" 232. The magnetic data acquiring code is stored in the memory 14 as the macro-key setting data by the macro-key data setting process as shown in FIG. 9. In step 95, the magnetic card data acquiring code "9120" is stored in the macro-key data setting filed 41. The processes shown in FIGS. 10, 15, and 16, i.e., the key reading process, the setting process of display message, and the display process, are executed in the same way as those in the first to third embodiments.

With reference to FIGS. 24 and 25, the data acquiring process of the magnetic card data will be described.

The key reading process in FIG. 10 detects the registered macro-key, and the macro-key setting data process 240 is effected as shown in FIG. 24. That is, the microprocessor 13 reads setting data at the address corresponding to the value in the macro-key step counter 53. In step 241, the microprocessor 13 judges whether the read data is the magnetic card data acquiring code. If the read data is not the magnetic card data acquiring code, the microprocessor 13 executes the other key code process in step 242. If the data is magnetic card data acquiring code, the microprocessor 13 executes "magnetic card data acquiring process 243 as shown in FIG. 25. After this process, the microprocessor 13 checks the magnetic card data acquiring flag 512 in step 244. If the magnetic card data acquiring flag 512 is not "1", the microprocessor 13 stores the value in the setting data counter 52 in the macro-key step counter 53 in step 245. In the following step 246, the microprocessor 13 sends an error message to the display 15. Next, the microprocessor 13 ends the "macro-key setting data process".

If the magnetic card data acquiring flag 512 is "1" in step 244, the microprocessor 13 sets "1" to the magnetic card step counter 510 in step 247. The microprocessor 13 reads the magnetic card step counter 510, and reads data at address corresponding to the read magnetic card data 511 in step 248. The microprocessor 13 checks whether the read magnetic card data is the end code in step 249. If it is not the end code, the microprocessor 13 checks whether the read magnetic card data is a start code or a separation code in step 2410. If the magnetic card data is not the start code or the separation code, the microprocessor 13 transfers the magnetic card data to the key code decoding process in step 2411. If the magnetic card data is the start code or the separation code, the microprocessor 13 skips the transmission step. Next, the microprocessor 13 adds one to the value in the magnetic card step counter 510.

Next, processing returns to step 248, where the microprocessor 13 reads the value in the magnetic card step counter 510 again to returns to the data reading process. In step 249, the microprocessor 13 checks the read magnetic card data. If the read data is the end code, the microprocessor 13 resets the magnetic card data acquiring flag 512 and ends the macro-key setting data process in step 2413.

Referring now to FIG. 25, the magnetic card data acquiring process 243 will be described. In step 251, to prompt the operator to effect a magnetic card reading operation with the magnetic card reader, the microprocessor 13 sends a magnetic card requesting message to the display 15.

In step 252, the microprocessor 13 waits for inserting of the magnetic card. In step 253, if no card is inserted and there is key input of any key, the microprocessor 13 judges that inserting of the magnetic card is cancelled, and thus, resets the magnetic data acquiring flag 512 and ends the process in step 254.

If no magnetic card is inputted, and there is no key input, the microprocessor 13 keeps waiting for the inserting of the magnetic card. If a magnetic card is inserted into the magnetic card reader 224, the microprocessor 13 judges whether the reading is correctly executed in step 255. If the reading is erroneously done, the microprocessor 13 resets the magnetic data acquiring flag 512 in step 256 and ends this process.

If the reading is correctly done, the microprocessor 13 stores the read magnetic card data in the magnetic card data area 511 at the magnetic card data work area in step 257. In the following step 258, the microprocessor 13 sets the magnetic data acquiring flag 512. The process shown in FIG. 12 is performed in the same way as that of the first embodiment.

If it is assumed that the magnetic card data shown in FIG. 26 is inputted from the magnetic card reader 224, because the data at the address "1" is the start code, the data at the address "18" is the separation code, and the data at the address 23 is the end code, these codes are not transmitted to the key code decoding process. On the other hand, the data at addresses from "2" to "17" and from "19" to "22" is transmitted to the key decoding process in the same manner as the keyboard input.

This embodiment has been described with an example of the magnetic card. However, as a detachable card, an IC card or a punch card may be used. Moreover, the card may record character data in addition to numerical data.

As mentioned above, according to the fourth embodiment, the magnetic card data acquiring code can be set to a macro-key, and the data in the magnetic card is read in response to depression of the macro-key and the data is processed as the key input data. Thus, the data in the magnetic card can be automatically inputted. The features of the first to fourth embodiments can be combined.

What is claimed is:

1. An electronic cash register comprising:
a keyboard including at least a macro-key;
operator registering means for correspondingly registering identification codes and numbers of operators;
setting means for storing an operator number acquiring code for said macro-key in a macro-key data storing area in response to a setting operation;
logon means for logging on said electronic cash register with said identification code of one of said operators to identify said number of said operator in charge; and
operator number acquiring means responsive to said macro-key for judging whether there is said operator number acquiring code in said macro-key data storing area, acquiring and outputting said identified number of said operator as key code data.

2. An electronic cash register as claimed in claim 1, further comprising repetition code setting means for storing a repetition start code and a repetition end code, and key code data between said repetition start code and said repetition end code in said macro-key data storing area with correspondence to said macro-key in response to another setting operation, and macro-key code generation means responsive to said macro-key for repeatedly generating and outputting said key code data a specified number of times.

3. An electronic cash register as claimed in claim 2, wherein said specified number is also stored in said macro-key data storing area.

4. An electronic cash register as claimed in claim 2, wherein said specified number is inputted from said keyboard.

5. An electronic cash register as claimed in claim 1, further comprising card reading means for reading data in a detachable card for storing data, card reading code setting means for storing a card reading code in said macro-key data storing area with correspondence to said macro-key in response to another setting operation, and macro-key code generation means for reading said data in said card in response to said macro-key and generating key code data from said data read from said detachable card.

6. An electronic cash register comprising:
a keyboard including at least a macro-key;
operator registering means for correspondingly registering identification codes, numbers of operators, and manager rank data, said manager rank data indicating that each of said operator is in either a manager rank or not;
setting means for storing a manager number acquiring code for said macro-key in a macro-key data storing area in response to a setting operation;
logon means for logging on said electronic cash register with said identification code of one of said operators to identify said number of said operator in charge; and
manager number acquiring means responsive to said one of said macro-keys for judging whether there is said manager number acquiring code in said macro-key data storing area, acquiring said identified number of said operator when said manager rank data corresponding to said identified number indicates that said operator is in said manager rank, and outputting said identified number of said operator as said manger number in a key input code format.

7. An electronic cash register as claimed in claim 6, further comprising repetition code setting means for storing a repetition start code and a repetition end code, and key code data between said repetition start code and said repetition end code in said macro-key data storing area with correspondence to said macro-key in response to anther setting operation, and macro-key code generation means responsive to said macro-key for repeatedly generating and outputting said key code data a specified number of times.

8. An electronic cash register as claimed in claim 6, wherein said specified number is also stored in said macro-key data storing area.

9. An electronic cash register as claimed in claim 6, wherein said specified number is inputted from said keyboard.

10. An electronic cash register as claimed in claim 6, further comprising a card reading means for reading data in a detachable card for storing data, card reading code setting means for storing a card reading code in said macro-key data storing area in response to anther key operation, and macro-key code generation means for reading said data in a card in response to said macro-key and generating key code data from said data read from said detachable card.

* * * * *

UNITED STATES PATENT AND TRADEMARK OFFICE
CERTIFICATE OF CORRECTION

| | | |
|---|---|---|
| PATENT NO. | : 6,666,373 B2 | Page 1 of 1 |
| APPLICATION NO. | : 09/932117 | |
| DATED | : December 23, 2003 | |
| INVENTOR(S) | : Kenichi Ishikawa | |

It is certified that error appears in the above-identified patent and that said Letters Patent is hereby corrected as shown below:

Title Page, Item (73) Should Read:

(73) Assignee: change "Matsushita Electric Industrial, Inc." to
--Matsushita Electric Industrial Co., Ltd.--

Col. 14, line 49, change "anther" to --another--.

Col. 14, line 62, change "anther" to --another--.

Signed and Sealed this

Thirteenth Day of March, 2007

JON W. DUDAS
*Director of the United States Patent and Trademark Office*